US006854588B1

(12) United States Patent
Blattner et al.

(10) Patent No.: US 6,854,588 B1
(45) Date of Patent: Feb. 15, 2005

(54) TRAY CONVEYOR/LOADING SYSTEM

(75) Inventors: Michael F. Blattner, Covington, LA (US); Christopher G. Greve, Covington, LA (US)

(73) Assignee: Allpax Products, Inc., Madisonville, LA (US)

( * ) Notice: Subject to any disclaimer, the term of this patent is extended or adjusted under 35 U.S.C. 154(b) by 0 days.

(21) Appl. No.: 10/462,285

(22) Filed: Jun. 16, 2003

(51) Int. Cl.⁷ .............................................. B65G 47/04
(52) U.S. Cl. .................................. 198/468.8; 198/418.6
(58) Field of Search ........................... 198/468.8, 418.6; 53/152, 539, 247

(56) References Cited

U.S. PATENT DOCUMENTS

| | | | |
|---|---|---|---|
| 3,973,667 A | * | 8/1976 | Jellema et al. ............ 198/418.6 |
| 3,996,723 A | | 12/1976 | Greenwell |
| 4,506,493 A | | 3/1985 | Horton |
| 4,703,606 A | | 11/1987 | Andersson |
| 4,781,011 A | | 11/1988 | Prakken |
| 4,864,801 A | | 9/1989 | Fallas |
| 6,112,882 A | * | 9/2000 | Yuyama et al. ........... 198/468.8 |
| 6,554,124 B2 | * | 4/2003 | Colamussi et al. ....... 198/418.6 |

* cited by examiner

Primary Examiner—Joseph E. Valenza
(74) Attorney, Agent, or Firm—Joseph T. Regard, Ltd, PLC (57) ABSTRACT

A trap door system for receiving a plurality of articles from a pick and place mechanism, moving those articles to the vicinity of an underlying tray on a conveyor, and dumping those articles on said conveyor in a pre-arranged layout, forming loaded trays, which loaded trays may then be positioned in a frame to form a cube for retort processing of the contents of the articles. The preferred embodiment of the invention contemplates a horizontally situated product gate for receiving a plurality of pouches which are received upon four side-by-side holding slots running the length of the pouch gate by a pick and place mechanism. The pouch gate is then lowered a predetermined distance (in the present case, about 12–18 inches) so as to be situated just above a transversely aligned conveyor having a series of retort trays or pallets thereon, the underlying tray or pallet being aligned with the holding slots of the lowered tray such that, when the holding slots are pivoted about their longitudinal axis (as in a trap door), so that the pouches thereon fall through the pouch gate and onto predetermined compartments on the underlying retort tray.

23 Claims, 8 Drawing Sheets

TRAY CONVEYOR/LOADING SYSTEM

TECHNICAL FIELD OF THE INVENTION

The present invention relates to apparatus and method for loading batch processing systems, and in particular to a trap door system for receiving a plurality of articles from a pick and place mechanism, moving those articles to the vicinity of an underlying tray on a conveyor, and dumping those articles on said conveyor in a pre-arranged layout, forming loaded trays, which loaded trays are then positioned in a frame to form a cube for retort processing of the contents of the articles.

The preferred embodiment of the invention contemplates a generally horizontally situated pouch gate for receiving a plurality of pouches, which includes four side-by-side holding slots running the length of the pouch gate, for receipt of product from a pick and place mechanism. The pouch gate is then lowered a predetermined distance (in the present case, about one foot) so as to be situated just above a transversely aligned conveyor having a series of retort trays or pallets thereon, the underlying fray or pallet being aligned with the holding slots of the lowered pouch gate such that, when the holding slots are pivoted about their longitudinal axis (as in a trap door), the pouches thereon fall through the pouch gate and onto predetermined compartments on the underlying retort tray.

The preferred, exemplary embodiment of the present invention has four slots, each slot configured to hold nine pouches laid along a common longitudinal axis, although the actual layout can vary substantially depending upon the application and product conveyed.

The present system provides enhanced loading efficiency for the system, lessening the amount of travel for the pick and place mechanism, while eliminating the Z-Axis movement which would otherwise be required to unload the mechanism, so as to dampen vibration in the system during operations.

BACKGROUND OF THE INVENTION

The utilization of trap door-type devices for loading product into a designated container, which might comprise a box, tray, pallet, or underlying conveyor has been shown in various configurations and for various methodologies in the prior art.

Trap door-type loading devices have been utilized in conjunction with loading product into boxes and the like, but none are believed to include the configuration or transport features of the present invention.

Examples of patents related to article compiling and depositing apparatus include the following:

| Patent Number | Inventor | Date of Issue |
| --- | --- | --- |
| 3,996,723 | Greenwell | Dec. 14, 1976 |
| 4,506,493 | Horton | Mar. 26, 1985 |
| 4,864,801 | Fallas | Sept. 12, 1989 |
| 4,781,011 | Prakken | Nov. 1, 1988 |
| 4,703,606 | Andersson | Nov. 3, 1987 |

For example, U.S. Pat. No. 3,996,723 issued 1976 teaches an "Article Collator" in the form of a series of six longitudinally aligned compartments (82–86), which are configured to receive product and then open via trap-door type floor to deposit the articles thereon into an underlying container, which may be situated upon an aligned conveyor there below.

U.S. Pat. Nos. 4,864,801, 4,703,606, 4,781,011, and 4,506,493, comprise examples of other article loading systems employing a trap-door type configuration for receiving product so as to align said product with an underlining container, depositing said product into said container.

While the above patents teach various systems for compiling product then depositing same into an underlying container, sometimes on a conveyor, none teach the apparatus or method of operation of the present invention.

Particularly, none of the above cited patents teach, contemplate, or suggest the concept of utilizing a trap door collator system for receiving an plurality of arranged product (which may include, for example, pouches, cans, jars, bottles, paper packages, boxes, cartons, or other containers or products) from a pick and place machine, repositioning said received product to the vicinity of a receiver tray, depositing said product upon said receiver tray in a predetermined configuration, and recycling to receive the next placement cycle from the pick and place machine in such a manner as to lessen the amount of travel of said pick and place mechanism, thereby lessening cycle time, wear, maintenance, and overall cost of operation.

GENERAL SUMMARY DISCUSSION OF THE INVENTION

Unlike the prior art, the present invention provides a system for receiving a plurality of articles in a predetermined layout from a pick and place mechanism during a loading operation, repositioning the articles for loading upon a tray, depositing said articles on said tray while maintaining positioning of the articles, and recycles to a receiving position for receiving new articles from the pick and place mechanism in timed sequence.

The present invention relates to apparatus and method for loading industrial, medical or scientific batch processing apparatus such as retorts, sterilizers, autoclaves or the like, and in particular to a traap door conveyor/repositioning system for receiving a plurality of articles from a pick and place mechanism, moving those articles to the vicinity of an underlying tray on a conveyor, and dumping those articles on said conveyor in a pre-arranged layout, thereby providing loaded trays, which loaded trays are then positioned in a frame to form a cube for retort processing of the contents of the articles.

Retort processing requires specialized loaders for the containers, which may comprise glass or plastic containers, as well as film containers such as pouches or the like. The present system provides a new and unique device which may be utilized with existing retort loading systems to increase speed and efficiency, as well as being utilized with custom designed machinery which incorporates the features of the present invention.

Many of the present systems utilize automated article transfer apparatus such as pick and place, industrial robots, which may be operated by solenoids or the like and controlled by computers and/or sensor arrays. Pick and place mechanisms are robotic in nature, in that a pick and place head is required to be automatically positioned to a pick up location at a precise time, pick up a plurality of product, and convey that product to a second location and place same in a precise location and within a precise time within the system cycle time.

Generally, the more directions (i.e., horizontal X-Y, or vertical Z) a pick and place head must traverse, the more expensive the unit; further, changes in direction tend to increase the overall cycle time of the unit, and as the speed increases, oscillation, vibration and product damage becomes concerns when the unit must change direction. Inertial dampeners and other means to lessen these problems are expensive and of limited functionality.

To resolve these issues, the present system is configured to provide an interface between the pick and place mechanism and the receiving tray, pallet or other container, in order to reduce a change of direction otherwise required of the pick and place mechanism, thereby reducing cycling time, oscillation and vibration problems, and the like.

The preferred embodiment of the present invention comprises a pouch gate juxtaposed between the pick and place head and the tray conveyor which receives the articles in the predetermined layout from the pick and place or other loading device, conveys said articles to the vicinity of the receiving tray or the like, deposits same, and recycles to receive more product from the pick and place head in synchronization with the loading device.

The preferred embodiment of the invention forms a trap door gate for receiving the product, hereinafter referred to as a pouch gate as pouches are the exemplary product being loaded in the exemplary embodiment, which pouches are situated on four side-by-side holding slots running the length of the pouch gate by a pick and place mechanism or the like.

The pouch gate is then repositioned (in the exemplary embodiment, lowered a predetermined distance, about one foot being the example) so as to be situated just above a transversely aligned conveyor having a series of retort trays or pallets thereon, thereby releiving the pick and place assembly the burden of having to traverse a new change of direction from horizontal to vertical.

The underlying tray or pallet is positioned to be aligned with the holding slots of the lowered pouch gate such that, when the holding slots are pivoted about their longitudinal axis (as in a trap door configuration), the pouches thereon fall through the pouch gate and onto predetermined compartments on the underlying retort tray. A CPU controls the positioning and operation of the various components to insure full loading of the conveyor trays and optimal cycle times.

The pouch gate is then recycled into its receiving position, wherein the pick and place mechanism deposits more articles on the pouch gate in the predetermined configuration.

Concurrent with the loading of the pouch gate and the repositioning of the pouch gate above the underlying conveyor, the loaded tray is conveyed away and an unloaded tray or pallet is positioned to receive the articles from the loaded conveyor.

The preferred, exemplary embodiment of the present invention has four slots, each slot configured to hold nine pouches laid along a common longitudinal axis, although the actual layout can vary substantially depending upon the application and product conveyed.

It is therefore an object of the present invention to provide a trap-door receiving pouch gate configured to convey product from a receiving location in the vicinity of a pick and place or other loading mechanism to a receiving tray at a distinct unloading location.

It is another object of the present invention to provide a system for receiving product from a pick and place mechanism, repositioning said product to the vicinity of a receiving tray or pallet, dumping or unloading said product upon said receiving tray in a predetermined layout, and recycling to a receiving position in sequence with said pick and place mechanism.

It is still another object of the present invention to provide a method of dampening the vibration, oscillation, and/or sway of a pick and place mechanism by providing a secondary device which eliminates the necessity of change of direction of the pick and place mechanism.

It is still another object of the present invention to provide a trap door pouch gate which receives a plurality of articles in a predetermined layout, repositions said articles to a secondary location, and deposits said articles to a secondary receiver in said predetermined layout.

It is another object of the present invention to provide a system for loading trays in forming sterilization cubes in a retort, sterilization, or autoclave operation utilizing a pouch gate system for receiving product from a horizontally conveying pick and place head, to a pouch gate, vertically position said gate from a hand off area to an unloading area, deposit said product upon said receiver tray, and vertically reposition the pouch gate to receive product via hand off from said pick and place head in timed coordination with same.

Lastly, it is an object of the present invention to provide an intermediary method for use in pick and place and other mechanized article loading systems, wherein there is provided a receiving tray and repositioning system cycled to seamlessly receive, reposition, unload, and recycle so as to eliminate a change of direction in a pick and place mechanism, speeding up same, while lessening the general cost of the system, as well as providing diminished service requirements and increased efficiency.

BRIEF DESCRIPTION OF DRAWINGS

For a further understanding of the nature and objects of the present invention, reference should be had to the following detailed description, taken in conjunction with the accompanying drawings, in which like parts are given like reference numerals, and wherein.

DETAILED DISCUSSION OF THE INVENTION

Figure 5:
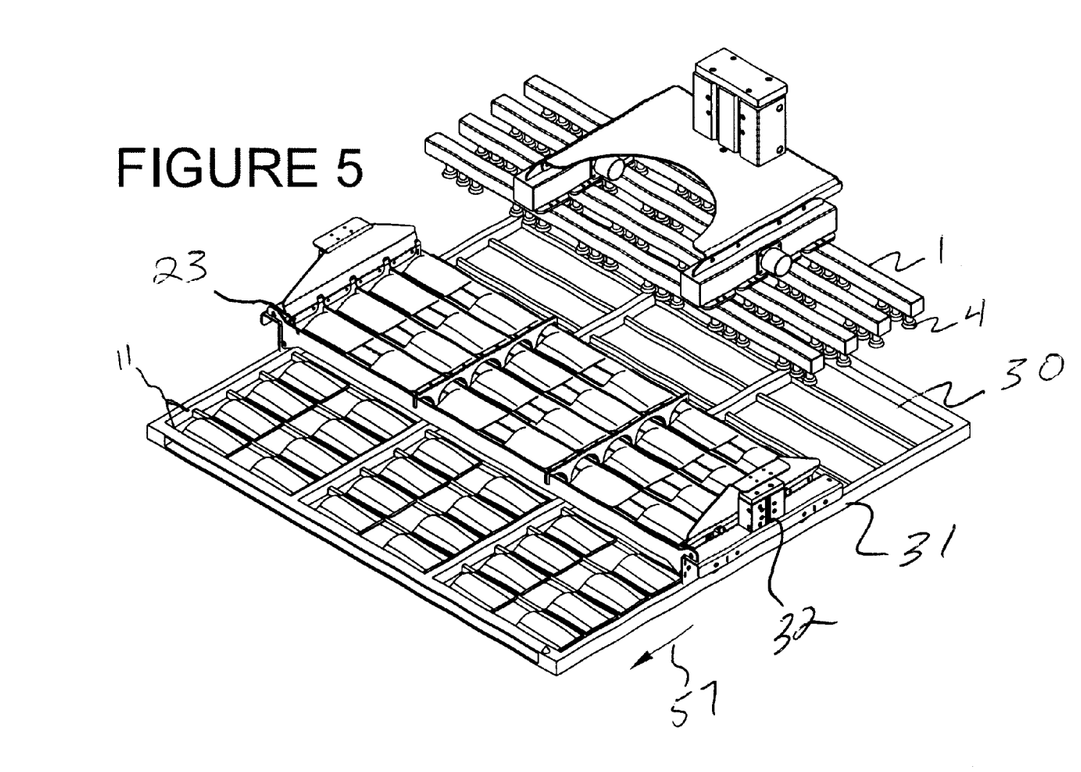
FIG. 5 illustrates the loaded pouch gate fully positioned and indexed above the tray to be loaded.
Figure 6:
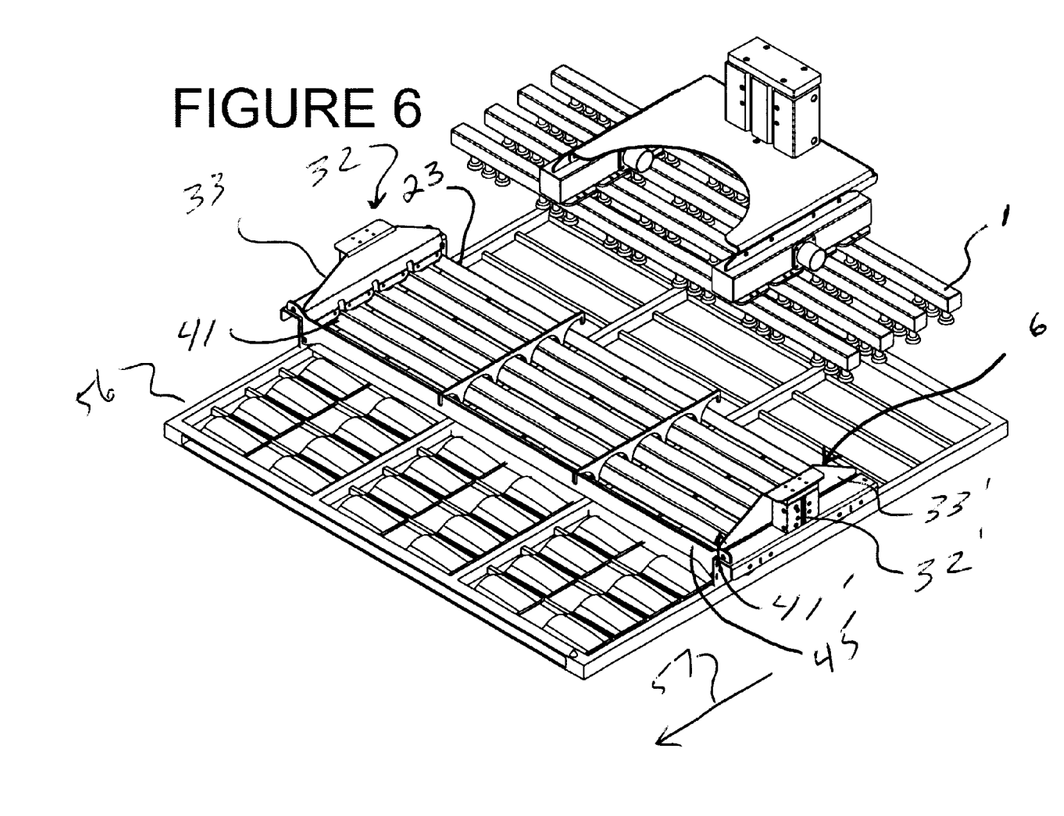
FIG. 6 illustrates the pouch gate having loaded the pouches upon the tray, the pouch gate now ready to recycle and reposition itself vertically to meet the pick and place mechanism to receive more product, and load another tray.
Figure 7:
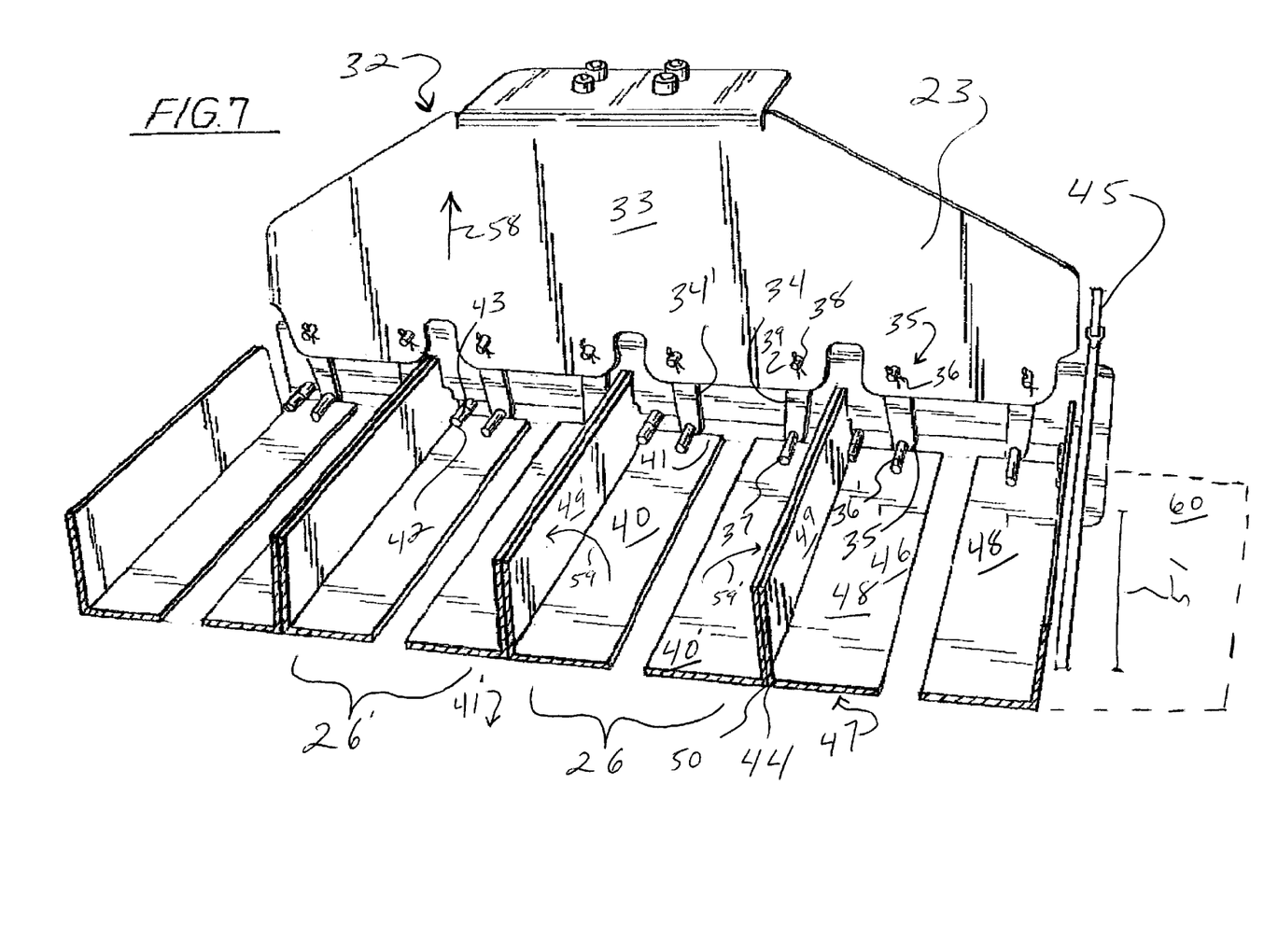
FIG. 7 is a cutaway, isometric view of the pouch tray of the invention of FIG. 1 the longitudinal support members in a pouch supporting mode.

Referring to FIGS. 5, 6, & 7 of the drawings, the system of the present invention utilizes a receiver tray or pouch gate assembly 23 for receiving product from a pick and place head or the like, the pouch gate assembly supported by a frame 45 having first 41 and second 41' ends, a top, supporting surface 46, and an underside 47, the frame supporting a plurality of angled support members 40 pivotally 42 situated therein in longitudinal 51 alignment.

As shown, each of the angled support members 40, 40' comprises a first 48 supporting section and a second 49 separating section, the sections perpendicularly situated 50 relative to one another along their respective length to form an elongated, angled support member, each of the angled support members 40, 40' arranged on the frame so as to oppose one another so that the angled support members supporting sections 48 are horizontally aligned along the same, generally horizontally situated plane 60, and the separating sections 49, 49' are vertically aligned, situated in parallel fashion on opposing outer edges of the support members when the pouch gate is in the upright, product receiving and supporting position (as shown in FIG. 7), so as to form gate slots 26, 26' to receive and support product therein, which are separated from one another via the separating sections, as will be further explained infra.

As shown, each of the angled support members 40, 40' are pivotally engaged at their opposing ends to the frame 45 via barrel hinges 41 or the like, which hinges are situated in the vicinity of the perpendicular area 44 where the first 48 supporting member meets the second 49 separating member.

Figure 8:
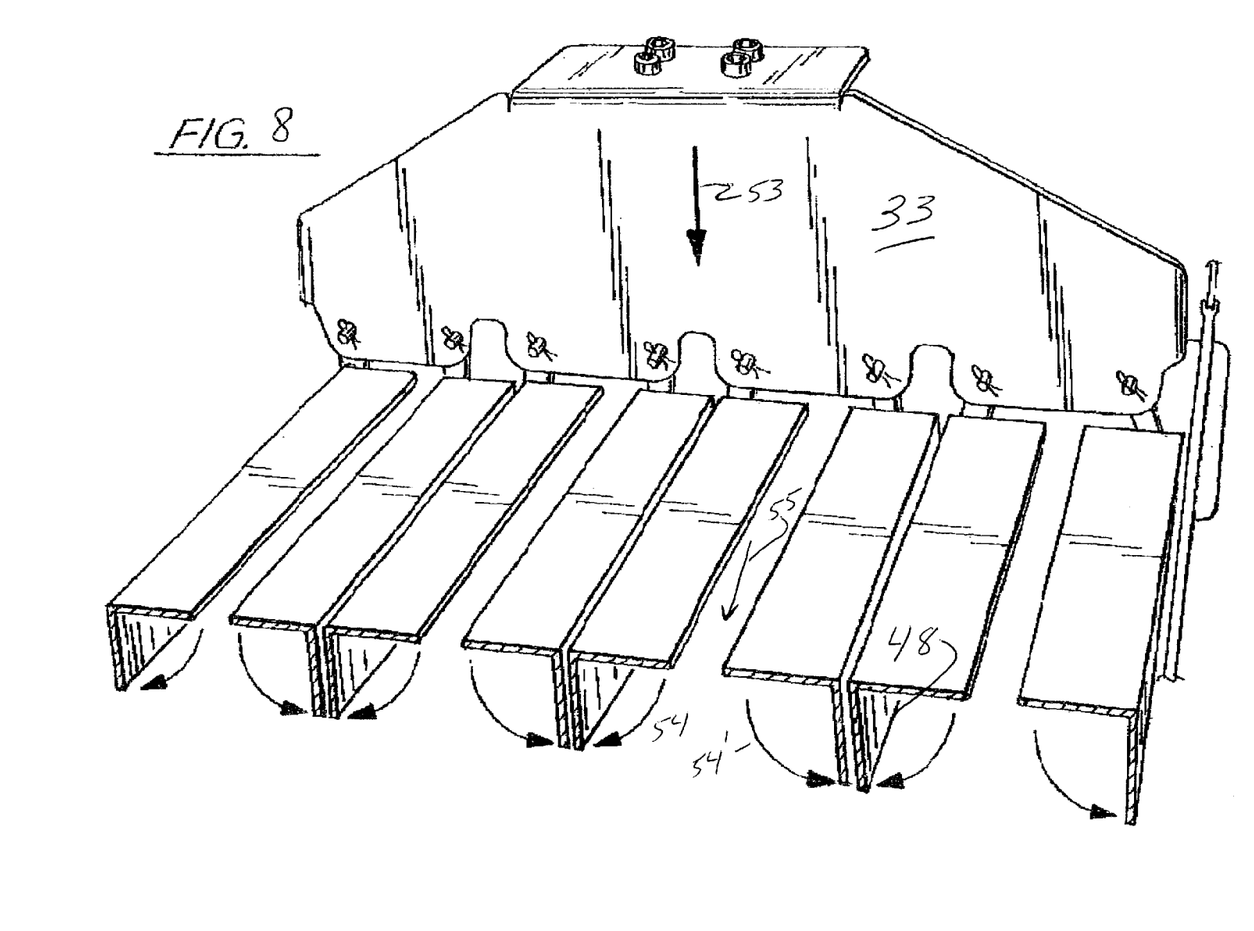
FIG. 8 is a cutaway, isometric view of the pouch tray of FIG. 8A, illustrating the longitudinal support members pivoted to dump the contents loaded thereon by the pick and place mechanism to an underlying receiver.

Continuing with FIGS. 6, 7, and 8, situated at the first 41 and second ends 41' of the frame 45 are first and second pneumatic actuators 32, 32', respectively, the actuators 32, 32' engaging and supporting activation members 33, 33', respectively, which activation members engage opposing ends of the angled support members 40, 40' via linkages 34, 34', and 16, respectively.

As shown, each of the linkages 34, 34', and 16 are configured to control the pivotal position of the angled support members, which linkages have first 35 and second 35' ends which are pivotally connected 36 (via shaft 38 and cotter pin 39) to the respective activation member situated at said end, and pivotally connected 36' to the first 48 supporting member via barrel hinges 37 or the like respectively so that when the pneumatic actuators 32, 32' raise 58 their respective activation members 33, 33', the linkages 34, 34' support the supporting sections 48 in horizontal, planar, supporting fashion and the separating sections 49 in generally vertical, parallel fashion, so as to form gate slots 26, 26' to receive product thereupon (as shown in FIG. 7).

Further, the system is configured so that when the pneumatic actuators 32, 32' lower 53 the activation members 33, 33', the linkages 34, 34' engaging activation members 33, 33' urge via their respective connection with the supporting sections 48 the angled support members 40 to pivot via pivotal 42 connection (via barrel hinges 43) to downwardly pivot 54, 54', so as, in effect, to open gate slots 26, 26' as a trap door, causing the product to drop 55 therethrough, while placing the pouch gate in the product deployed position. The first supporting member 48 is then repositioned in a generally vertical, downwardly oriented configuration.

As shown in FIG. 8 and FIG. 6, once product has dropped therethrough so as to fall upon an underlying receiver tray 56 (shown already conveyed 57 from under the pouch gate via a conveyor in FIG. 6), the pneumatic actuators 32, 32' raise 58 activation members 33, 33', causing the linkages 34, 34' to pivot 59, 59', the supporting sections 48, 48' pivot 59, 59' back to the product receiving, horizontal, planar support configuration of FIG. 8A, wherein the gate slots 26, 26' are formed between the opposed, perpendicularly situated separating sections 49, 49' as shown.

Continuing with FIGS. 1, 2, 3, 4, 5, and 6, the system S of the present invention incorporates the pouch gate 23 assembly upon a receiver tray assembly R, which is configured to receive product from a pick and place assembly P via the pouch gate assembly, vertically reposition the pouch gate assembly vertically downward to the vicinity of an underlying tray, deposit said product upon said tray, and recycle by upwardly moving the pouch gate assembly to the receiving position so as to receive the next hand off of product from the pick and place mechanism.

The pick and place assembly P comprises a pick and place head 1 having a plurality of parallel support members 3, 3' having suction cups 4 situated along their length to form a suction array 2 for engaging product (pouches 8 are shown in the present example), the suction cups are manipulated to engage a product, applying suction to same to lift, the system further configured to transfer 6 and deposit the engaged product from a first location via track 5 powered by drive motors or servos 7, 7', to the pouch gate assembly 23, where the product 9 is deposited in a single layer along the gate slots 26, 26' (shown in FIG. 7) formed thereon.

As shown, the receiver tray assembly R incorporates the pouch gate having the frame 45 having first 35 and second 35' ends which engage first 22 and second 22' vertical support members via vertical tracks 20 situated thereon. As discussed above, the pouch gate receives product from the pick and place head while the angled support members are positioned in the configuration shown in FIG. 7, so as to form the gate slots 26, 26' for receiving product thereon.

Continuing with FIGS. 1–7, the tracks 20 on the first 22 and second 22' vertical support members utilize HIWEN brand linear guide blocks in the preferred embdodiment, blocks are directly mounted to the pouch gate mechanism. Further, in the preferred embodiment, the guide blocks on opposing sides of the pouch gate are moved in unison by a single servo drive motor 21 that drives a timing pulley and belt attached to the guide blocks. The timing pulley and belt assemblies (1 for each side) are coupled by a common shaft that spans the distance between each end of the pouch gate.

The drive motor 21 for the receiver tray assembly R is controlled via sensors and/or computer to selectively position 24 the pouch gate assembly 23 in vertical fashion vertically along the tracks 20 via the belt assembly providing a lifted or raised 27 position to receive product hand-off or placement 28 from the pick and place assembly.

Once product has been placed upon the pouch gate assembly via the pick and place head, the pouch gate assembly is then lowered 29 via the track 20 and motor 21 so that said pouch gate assembly 23 is positioned above conveyor 30 having trays thereon for receiving the product from the pouch gate assembly 23, which unloads in the manner discussed supra (and in the position shown in FIG. 8) to allow the product to pass therethrough (the actuators 32, 32' lower 53 the activation members 33, 33', causing angled support members 40 to pivot 54 via linkages 34, 34', dropping 55 the product therethrough, as shown in FIGS. 7 and 8), to the underlying tray.

After unloading the contents to the underlying tray, the pouch gate assembly 23 is reset for another load and is raised 27 via the vertical track 20 for the next placement by the pick and place assembly P.

The sequence is timed so that the pouches from the pouch gate assembly are deposited in a predetermined spacing and position on the pouch tray, filling the length of each slot 11 in the underlying tray 56 with a predetermined amount of pouches in a single layer.

The loaded trays may then be conveyed 57 for further processing of the product thereon, which may include batch retort processing via further placement of the trays in retort baskets.

Figure 1:
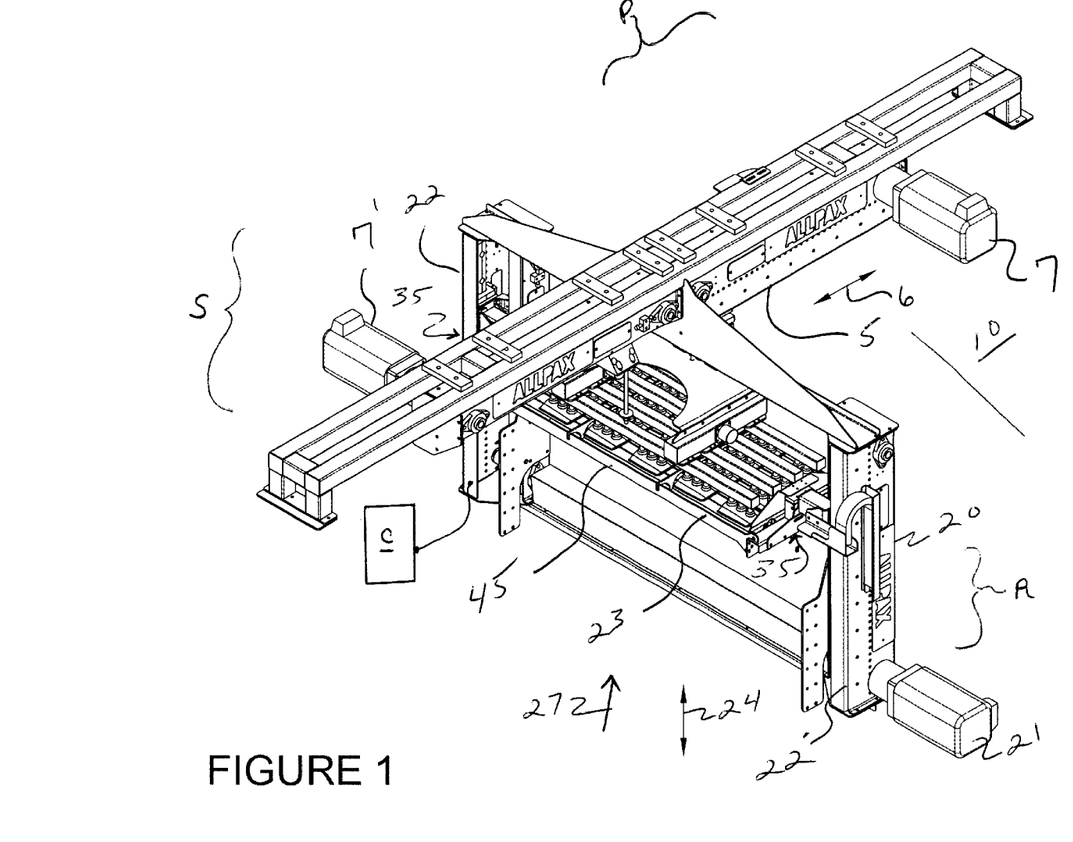
FIG. 1 is an isometric view of the tray conveyor of the preferred embodiment of the present invention, illustrating the pick an place mechanism loading a plurality of articles upon the receiver or pouch gate, as well as the system for vertically conveying said pouch gate to the conveyor tray and unloading same.
Figure 2:
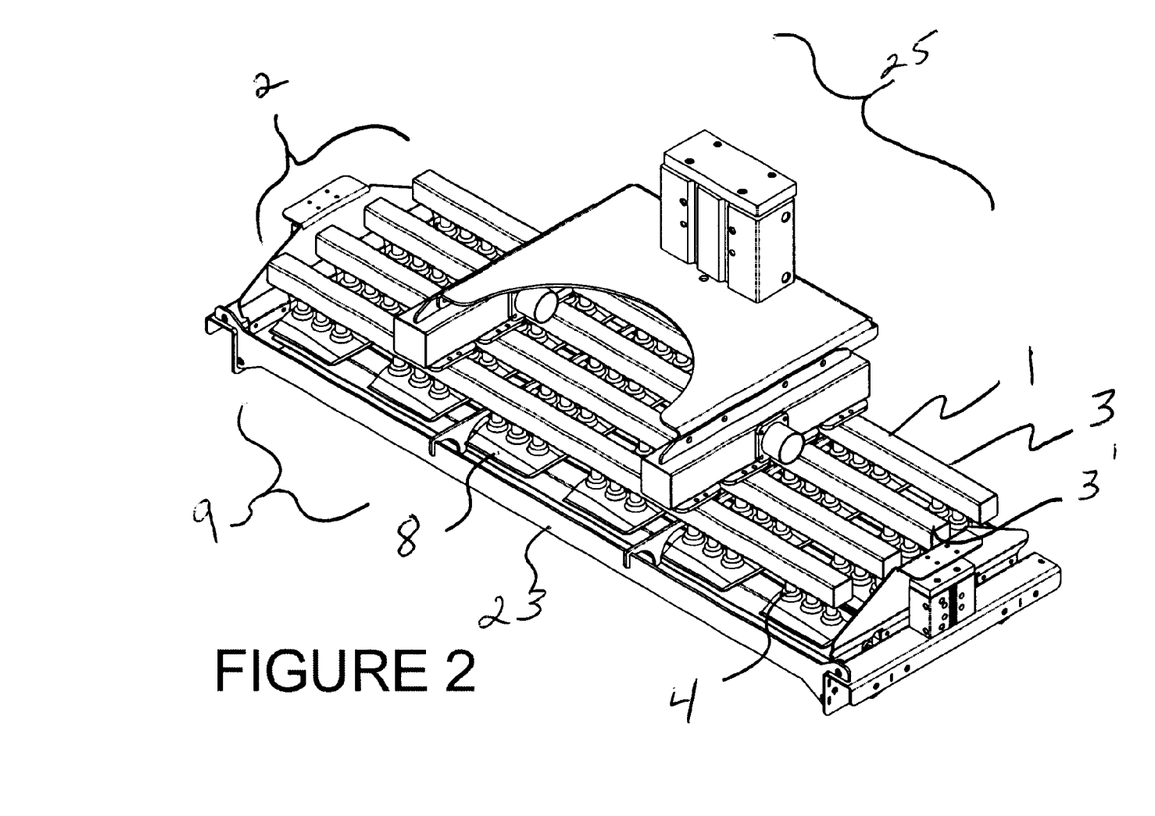
FIG. 2 is a close-up, isometric view of the pick and place mechanism and pouch gate of FIG. 1, illustrating the suction cub assembly ready to hand-off a plurality of pouches to the receiver, providing a loaded pouch gate.
Figure 3:
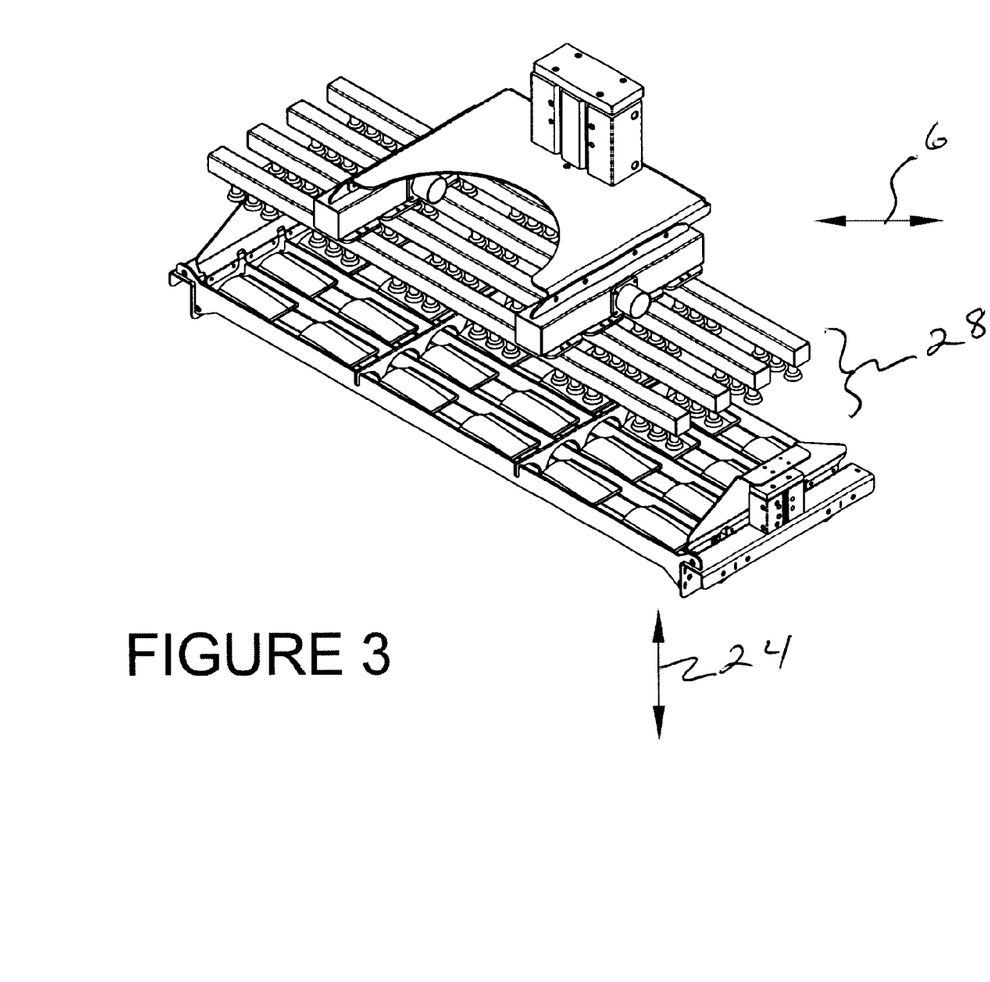
FIG. 3 is a isometric view of the invention of FIG. 2, illustrating the loaded pouch gate lowering while the pick and place assembly recycles for another pick.
Figure 4:
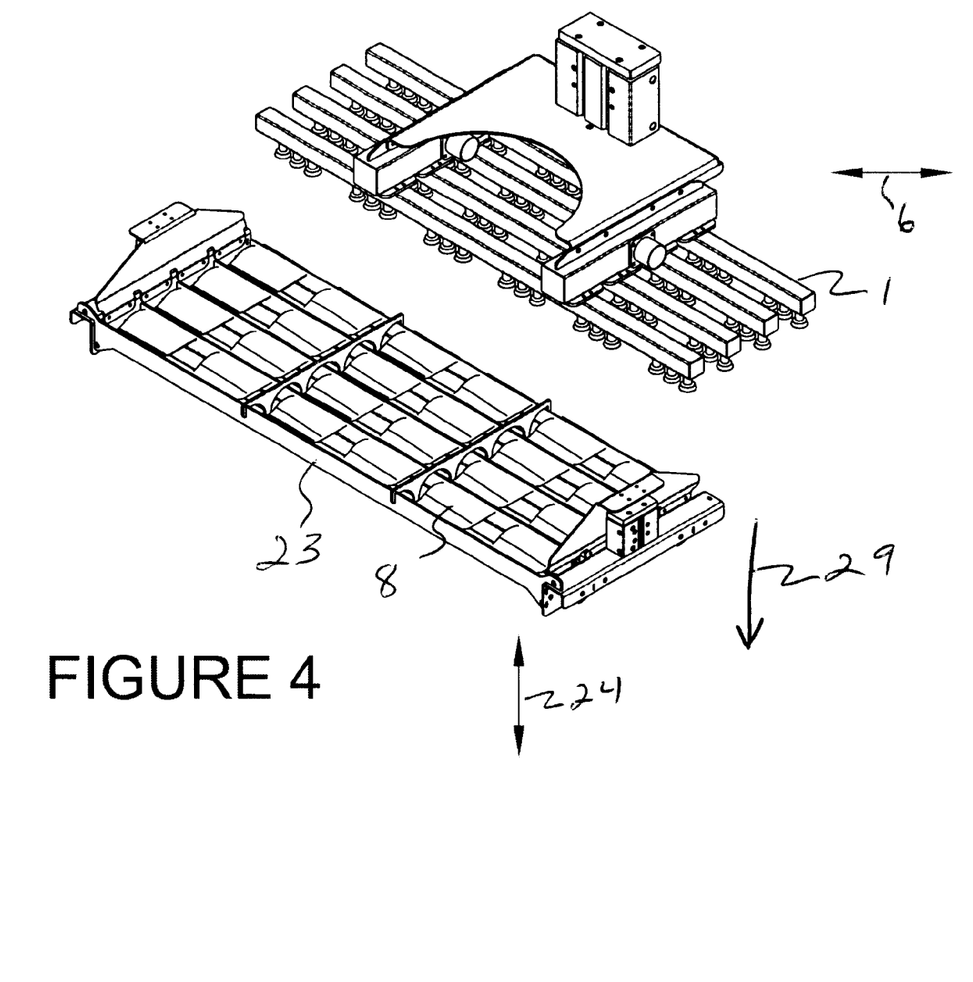
FIG. 4 is an isometric view of the invention of FIG. 3, illustrating the loaded pouch gate lowering still further to a tray (not shown), while the pick and place assembly continues to cycle for another pick.

As shown in FIG. 1 of the drawings, the present system including the receiver tray assembly including the pouch gate, motor and track, as well as the pick and place assembly and other components may be controlled and monitored via a CPU C which monitors and controls the pick and place assembly P and receiver tray assembly. The CPU can further comprise, for example, a computer system networked to monitor and control a production area which includes the pick and place assembly P, receiver tray assembly, R and conveyor 30 systems.

Other components which may likewise be controlled could include basket loading components, a retort or sterilizer apparatus, etc. Alternatively, various components may be timed to function in coordinated operations, or utilize proximity switches or other means, or may be manually operated by an operator.

In the exemplary embodiment of the present invention, the vertical travel 27 of the pouch gate is about twelve to eighteen inches; the pick and place mechanism positions itself horizontally above the pouch gate and may drop vertically about 1–2 inches via solenoid before placing the product in the gate slots, although such vertical positioning may not be necessary with the pick and place mechanism, as it would be desirable to eliminate the change in direction required for such a repositioning.

It is estimated that the cycle time from handoff to handoff for the gate pouch on the receiver tray assembly, including placement of product upon the pick and place head, the pouch gate vertically moving downward to position above an underlying tray, handoff of product to the tray via opening of the gate slots, closing the gate slots and vertically positioning upward for the next placement is, for example, about six seconds, or 10 cycles per minute.

The CPU C or computer of the exemplary embodiment of the invention simultaneously controls the conveyor 30, pick and place assembly P, and receiver tray assembly R, and it is programmed to coordinate movement between the components to provide seamless operations between said components so that continuous timed operations occur, so that the pick and place assembly operates at optimal cycle times, the receiver tray assembly receives the placement or hand off from the pick and place assembly with no delays, and each slot in each tray on the underlying conveyor is filled to specification with product.

A summary of the preferred method of of transporting product from a pick and head to a secondary location of the present invention is expressed as follows a. providing a trap door conveyor system, comprising:
   a frame having first and second ends, a length, a top and a bottom;
   a plurality of support members having first and second ends and a length, said first and second ends of said support members pivotally engaging said first and second ends of said frame, respectively, to selectively form a support surface for receiving product thereon, forming a product support mode;
   a linkage system for orienting said support members from said product supporting mode, to an unloading mode, wherein there is formed between said support members a space for the passage of said product therebetween;
   positioning means for positioning said trap door system from a receiving location to an unloading location and visa versa;

b. positioning said trap door system in the vicinity of said pick and place head;

c. depositing product from said pick and place head upon said support members slots formed in said trap door system, providing a loaded trap door system;

d. positioning said loaded trap door system at a secondary location, utilizing said positioning means;

e. utilizing said linkage system to orient said support members to form a space therebetween to allow product situated thereupon to pass therebetween, unloading said loaded trap door system;

f. utilizing said linkage system to orient said support members to form a product support for supporting product thereupon, providing an unloaded trap door system;

g. repositioning said unloaded trap door system to the vicinity of said pick and place head;

h. repeating steps b–g.

The exemplary embodiment of the invention includes four gate slots supporting four lines of product therein, each line supporting, for example, 8 pouches laid in a single layer end to end, providing a total product movement of about 320 pouches per minute.

In summary, the present system provides a means of lessening the travel of a pick and place head, receiving product from the pick and place head in hand off fashion, repositioning said product above a receiver, depositing said product, and repositioning for the next hand off in timed unison with the pick and place head, thereby lessening the amount of travel required by the pick and place head, while decreasing cycle time.

Further, the present system provides a means of vertically manipulating product received from a pick and place mechanism, which may only transport product in horizontal fashion, thereby allowing the utilization of a less expensive pick and place mechanism than one which moves in both horizontal and vertical lines of movement.

Lastly, the present invention provides a system for lessening oscillation and vibration characteristics in a pick and place mechanism, requiring less changes of direction in the system, thereby lessening stress, vibration, oscillation problems, and accompanying maintenance requirements and costs, while increasing speed and reliability of the system.

ELEMENTS
of the
Invention

| Element | Description |
| --- | --- |
| S | System |
| R | Receiver Tray Assembly |
| P | Pick and Place assembly |

-continued

ELEMENTS of the Invention

| Element | Description |
|---|---|
| C | CPU |
| 1 | Pick and place head |
| 2 | suction array |
| 3,' | parallel support members |
| 4 | suction cups |
| 5 | track |
| 6 | horizontal movement |
| 7,' | drive motors |
| 8 | pouches |
| 9 | product |
| 10 | in feed conveyor |
| 11 | slots |
| 20 | vertical track |
| 21 | motor |
| 22,' | support members |
| 23 | pouch gate assembly |
| 24 | vertical movement |
| 25 | horizontally support surface |
| 26,' | gate slots |
| 27 | raised |
| 28 | receive via hand-off or placement |
| 29 | lowered |
| 30 | conveyor |
| 31 | tray |
| 32,' | pneumatic actuators |
| 33,' | engagement/activation members |
| 34,' | linkages |
| 35,' | first, second ends |
| 36,' | pivotally connected |
| 37 | barrel hinge |
| 38 | shaft |
| 39 | cotter pin |
| 40 | angled support member |
| 41' | first, second ends |
| 42 | pivotally affixed |
| 43 | barrel hinge |
| 44 | perpendicular area |
| 45 | frame |
| 46 | top, support surface |
| 47 | underside |
| 48 | supporting section |
| 49 | separating section |
| 50 | perpendicularly situated |
| 51 | length |
| 53 | lowered |
| 54 | removing support for articles thereon |
| 55 | drop |
| 56 | underlying receiver tray |
| 57 | conveyed |
| 58 | raised |
| 59,' | pivot |
| 60 | plane |

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

What is claimed is:

1. A conveyor for conveying product from a hand off location to a deposit location, comprising:

a trap door system, comprising:
a frame having first and second ends, a length, a top and a bottom;
a plurality of elongated support members having first and second ends and a length, said first and second ends of said support members pivotally engaging said first and second ends of said frame, respectively, so as to selectively form a support surface for receiving product thereon, forming a product support mode;
a linkage system for orienting said support members from said product supporting mode, to an unloading mode, wherein there is formed between said support members a space for the passage of said product therebetween;
positioning means for positioning said trap door system from a receiving location to an unloading location and visa versa;
control means for coordinating the operation of said trap door system and said linkage system so that said support members of said trap door system are in said product support mode when said trap door is at said receiving location, to an product unloading mode when said trap door is at said unloading location.

2. The conveyor of claim 1, wherein in said trap door system, each of said support members are angled at a right angle along their length, so as to form a support section and a separating section, said right angle forming an intersection of said support section and said separating section.

3. The conveyor of claim 2, wherein there is provided first and second activation members pivotally affixed to said first and second ends of said support members, respectively.

4. The conveyor of claim 3, wherein said frame is pivotally affixed to said support members via barrel hinges situated in the vicinity of said intersection formed at said support section and said separating section.

5. The conveyor of claim 4, wherein said first and second activation members are pivotally affixed to said support members via barrel hinges affixed to said support section of said support members.

6. The conveyor of claim 4, wherein said positioning means comprises first and second vertical tracks engaging first and second ends of said trap door system, and wherein there is further provided a conveyor situated between said first and second vertical tracks and under said trap door system for receiving product therefrom when said trap door system is in a product unloading location.

7. The conveyor of claim 6, wherein there is provided a pick and place assembly for placing product on said support members forming said trap door system when said trap door system is in a product receiving location.

8. The conveyor of claim 7, wherein said control means comprises a computer network monitoring and controlling said pick and place assembly, said conveyor, and said positioning means.

9. A vertical conveyor system, comprising:

a trap door receiver comprising:
a frame having first and second ends, a length, a top and a bottom;
a plurality of support members having first and second ends and a length, said support members aligned along said length, said first and second ends of each of said support members pivotally engaging said first and second ends of said frame, respectively;
orienting means for orienting said support members from a product support mode to a product unloading mode, wherein there is formed between said support members a space for the passage of said product therebetween;
positioning means for positioning said trap door system from a receiving location for receiving product to an unloading location for unloading product;
control means for coordinating the operation of said trap door system and said linkage system via said orienting means and said positioning means, so that said support members of said trap door system are oriented to a product support mode when said trap door is at said receiving location, to an product unloading mode when said trap door is at said unloading location.

10. The conveyor of claim 9, wherein in said trap door system, each of said support members are angled at a right angle along their length, so as to form a support section and a separating section, said right angle forming an intersection of said support section and said separating section.

11. The conveyor of claim 10, wherein there is provided first and second activation members pivotally affixed to said first and second ends of said support members, respectively.

12. The conveyor of claim 11, wherein said frame is pivotally affixed to said support members via barrel hinges situated in the vicinity of said intersection formed at said support section and said separating section.

13. The conveyor of claim 12, wherein said first and second activation members are pivotally affixed to said support members via barrel hinges affixed to said support section of said support members.

14. The conveyor of claim 13, wherein said positioning means comprises first and second vertical tracks engaging first and second ends of said trap door system, and wherein there is further provided a conveyor situated between said first and second vertical tracks and under said trap door system for receiving product therefrom when said trap door system is in a product unloading location.

15. The conveyor of claim 14, wherein there is provided a pick and place assembly for placing product on said support members forming said trap door system when said trap door system is in a product receiving location.

16. The conveyor of claim 15, wherein said control means comprises a computer network monitoring and controlling said pick and place assembly, said conveyor, and said positioning means.

17. A receiver tray for receiving, transporting, and unloading product, comprising:
a frame having first and second ends, a length, a top and a bottom;
a plurality of support members having first and second ends and a length, said first and second ends of each of said support members pivotally engaging said first and second ends of said frame, respectively, each of said support members having formed therein a right angle along their length, so as to form a support section and a separating section, said right angle forming an intersection of said support section and said separating section;
first and second vertical actuators associated with said first and second ends of said frame;
first and second activation members associated with said first and second vertical actuators, respectively;
a linkage system for orienting said support members from said product supporting mode, to a product unloading mode, wherein there is formed between said support members a space for the passage of said product therebetween said linkage system comprising individual linkages having first and second ends, said first ends of said linkages engaging one of said first or second activation members, said second ends of said linkages engaging one of said first or second ends of said support members;
wherein said first and second vertical actuators are formed to vertically adjust said first and second activation members from a first vertical position to a second vertical position, respectively; and wherein said linkage system is formed such that placing said first and second activation members in said first vertical position via said first and second vertical actuators urges said support members in said product supporting mode; and wherein said linkage system is formed such that placing said first and second activation members in said second vertical position via said first and section vertical actuators urges said support members into said product unloading mode.

18. The conveyor of claim 17, wherein said frame is pivotally affixed to said support members via barrel hinges situated in the vicinity of said intersection formed at said support section and said separating section.

19. The conveyor of claim 18, wherein said first and second activation members are pivotally affixed to said support members via barrel hinges affixed to said support section of said support members.

20. The conveyor of claim 19, wherein there is further provided positioning means for vertically positioning said receiver tray, said positioning means comprising first and second vertical tracks engaging first and second ends of said frame, and wherein there is further provided a conveyor situated between said first and second vertical tracks and under said trap door system for receiving product therefrom when said trap door system is in a product unloading location.

21. The conveyor of claim 20, wherein there is further provided a pick and place assembly for placing product on said support members forming said receiver tray when said support members are in a product receiving location.

22. The method of transporting product from a pick and head to a secondary location, comprising the steps of:
a. providing a trap door system, comprising:
a frame having first and second ends, a length, a top and a bottom;
a plurality of support members having first and second ends and a length, said first and second ends of said support members pivotally engaging said first and second ends of said frame, respectively, to selectively form a support surface for receiving product thereon, forming a product support mode;
a linkage system for orienting said support members from said product supporting mode, to an unloading mode, wherein there is formed between said support members a space for the passage of said product therebetween;
positioning means for positioning said trap door system from a receiving location to an unloading location and visa versa;
b. positioning said trap door system in the vicinity of said pick and place head;
c. depositing product from said pick and place head upon said support members slots formed in said trap door system, providing a loaded trap door system;
d. positioning said loaded trap door system at a secondary location, utilizing said positioning means;
e. utilizing said linkage system to orient said support members to form a space therebetween to allow product situated thereupon to pass therebetween, unloading said loaded trap door system;
f. utilizing said linkage system to orient said support members to form a product support for supporting product thereupon, providing an unloaded trap door system;
g. repositioning said unloaded trap door system to the vicinity of said pick and place head;
h. repeating steps b–g.

23. The method of transporting product from a pick and place head a vertical distance to a tray on a conveyor, comprising the steps of:

a. providing a conveyor system, comprising:
   a trap door receiver comprising:
      a frame having first and second ends, a length, a top and a bottom;
      a plurality of support members having first and second ends and a length, said support members aligned along said length, said first and second ends of each of said support members pivotally engaging said first and second ends of said frame, respectively;
b. orienting said support members of said trap door receiver to a product support mode wherein product can be placed and supported thereupon;
c. positioning said trap door receiver in the vicinity of and under a pick and place head loaded with product;
d. placing said product loaded on said pick and place head upon said support members of said trap door receiver, providing a loaded trap door receiver;
e. positioning said loaded trap door receiver in the vicinity of and above a tray on a conveyor, providing an underlying tray;
f. orienting said support members of said trap door receiver to a to form a space between said support members for passage of said product therebetween, and allowing product supported by said support members to pass through said space to said underlying tray, providing a loaded tray;
g. repeating steps b–f.

* * * * *